United States Patent
Yoon et al.

(10) Patent No.: US 10,324,661 B2
(45) Date of Patent: Jun. 18, 2019

(54) STORAGE DEVICE AND OPERATING METHOD THEREOF

(71) Applicant: SAMSUNG ELECTRONICS CO., LTD., Suwon-si, Gyeonggi-Do (KR)

(72) Inventors: Jong Hyun Yoon, Hwaseong-si (KR); Jupyung Lee, Incheon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 1 day.

(21) Appl. No.: 15/633,978

(22) Filed: Jun. 27, 2017

(65) Prior Publication Data

US 2018/0101330 A1    Apr. 12, 2018

(30) Foreign Application Priority Data

Oct. 12, 2016    (KR) .................. 10-2016-0132214

(51) Int. Cl.
    *G06F 12/00*    (2006.01)
    *G06F 3/06*    (2006.01)
    *G06F 12/02*    (2006.01)

(52) U.S. Cl.
    CPC .......... *G06F 3/0661* (2013.01); *G06F 3/0608* (2013.01); *G06F 3/0638* (2013.01); *G06F 3/0679* (2013.01); *G06F 12/0246* (2013.01); *G06F 2212/1024* (2013.01); *G06F 2212/401* (2013.01); *G06F 2212/7205* (2013.01); *G06F 2212/7211* (2013.01)

(58) Field of Classification Search
    CPC .... G06F 3/0661; G06F 3/0608; G06F 3/0679; G06F 12/0238; G06F 12/0246; G06F 12/0253; G06F 2212/7205
    See application file for complete search history.

(56) References Cited

U.S. PATENT DOCUMENTS

| | | | |
|---|---|---|---|
| 5,414,850 A | 5/1995 | Whiting | |
| 8,433,823 B2 | 4/2013 | Hugly et al. | |
| 8,478,731 B1 | 7/2013 | Throop et al. | |
| 8,706,953 B2 | 4/2014 | Cho et al. | |
| 8,949,513 B2 | 2/2015 | Huang et al. | |
| 8,959,280 B2 | 2/2015 | Yu et al. | |
| 2013/0073798 A1* | 3/2013 | Kang | G06F 12/0246 711/103 |
| 2013/0275396 A1 | 10/2013 | Condict et al. | |
| 2014/0059271 A1 | 2/2014 | Meir et al. | |
| 2015/0193342 A1 | 7/2015 | Ohara et al. | |
| 2015/0220277 A1 | 8/2015 | Lee et al. | |
| 2016/0110112 A1* | 4/2016 | Yeh | G06F 3/0608 711/103 |
| 2017/0220462 A1* | 8/2017 | Tsao | G06F 12/0253 |

* cited by examiner

*Primary Examiner* — Shawn X Gu
(74) *Attorney, Agent, or Firm* — F. Chau & Associates, LLC

(57) ABSTRACT

A storage device including a nonvolatile memory device and an operating method of the storage device. The method includes receiving first data from an external device, compressing the received first data based on a first compression ratio, programming the compressed first data in the nonvolatile memory device, reading second data from the nonvolatile memory device, compressing the second data based on a second compression ratio that may be higher than the first compression ratio, and programming the compressed second data in the nonvolatile memory device.

17 Claims, 13 Drawing Sheets

FIG. 10

| DATA(LBA) | GC Count | Update Count | Retention Time |
|---|---|---|---|
| DATA1 | GC_1 | UC_1 | RT_1 |
| DATA2 | GC_2 | UC_2 | RT_2 |
| DATA3 | GC_3 | UC_3 | RT_3 |
| ⋮ | ⋮ | ⋮ | ⋮ |
| DATAn | GC_n | UC_n | RT_n |

STORAGE DEVICE AND OPERATING METHOD THEREOF

CROSS-REFERENCE TO RELATED APPLICATIONS

This application claims priority to and the benefit of Korean Patent Application No. 10-2016-0132214 filed Oct. 12, 2016, in the Korean Intellectual Property Office, the entire contents of which are incorporated by reference herein.

TECHNICAL FIELD

The inventive concept disclosed herein relates to a semiconductor memory, and more particularly, to a storage device and an operating method thereof.

DISCUSSION OF THE RELATED ART

Semiconductor memory devices are classified into volatile memory devices, which lose data stored therein at power-off, and nonvolatile memory devices, which retain data stored therein even at power-off, Examples of volatile devices include a static random access memory (SRAM), a dynamic RAM (DRAM), and a synchronous DRAM, and nonvolatile device include a read only memory (ROM), a programmable ROM (PROM), an electrically programmable ROM (EPROM), an electrically erasable and programmable ROM (EEPROM), a flash memory device, a phase-change RAM (PRAM), and a ferroelectric RAM (FRAM).

A flash memory device is in widespread use as a mass storage medium in user devices such as a computer, a smartphone, and a server. The mass storage medium of a user device is configured to store a variety of user data. There are various methods and devices being developed to increase the capacity of the mass storage device. For example, there are ways to secure the capacity of the mass storage medium by compressing data received from an external device and storing the compressed data in the mass storage medium. However, according to the type of compression being used, compression operations may cause a delay (e.g., a write delay), thereby reducing performance in the mass storage medium.

SUMMARY

Embodiments of the inventive concept provide a storage device that may secure an available capacity while reducing a write delay by variably adjusting a compression ratio based on attributes of data or data-related parameters and an operating method thereof.

According to an embodiment of the inventive concept, an operating method of a storage device that includes a nonvolatile memory device includes the operations of: receiving a first data from an external device, compressing the first data based on a first compression ratio, programming the compressed first data in the nonvolatile memory device, reading a second data from the nonvolatile memory device, compressing the second data based on a second compression ratio that is higher than the first compression ratio, and programming the compressed second data in the nonvolatile memory device.

According to an embodiment of the inventive concept, a storage device includes a nonvolatile memory device, and a memory controller that programs data in the nonvolatile memory device and to read data from the nonvolatile memory device. The memory controller includes a variable compression engine that compresses first data received from an external device based on a first compression ratio and compresses second data from the nonvolatile memory device based on a second compression ratio higher or lower than the first compression ratio.

According to an embodiment of the inventive concept, an operating method of a storage device that includes a nonvolatile memory device includes receiving first data from an external device, programming the first data in the nonvolatile memory device without compression, reading second data from the nonvolatile memory device, compressing the second data based on a compression ratio, and programming the compressed second data in the nonvolatile memory device.

According to an embodiment of the inventive concept, a storage device includes a nonvolatile memory device, and a memory controller configured to program/write data in the nonvolatile memory device and to read data from the nonvolatile memory device. The memory controller includes a variable compression engine configured to compress first data received from an external device based on a first compression ratio and to compress second data from the nonvolatile memory device based on a second compression ratio that is different than the first compression ratio, wherein the second data is compressed based on a determination that a threshold quantity of actions have occurred; and the threshold quantity of actions is greater than 1.

BRIEF DESCRIPTION OF THE DRAWINGS

A person of ordinary skill in the art will better appreciate the inventive concept from the following description with reference to the following drawings, wherein like reference numerals refer to like parts throughout the various figures unless otherwise specified, and wherein:

FIG. 10 is a diagram illustrating information managed by a memory controller;

DETAILED DESCRIPTION

At least one embodiment of the inventive concept will be described more fully hereinafter with reference to the accompanying drawings, such that a person of ordinary skill in the art can practice the inventive concept.

Figure 1:
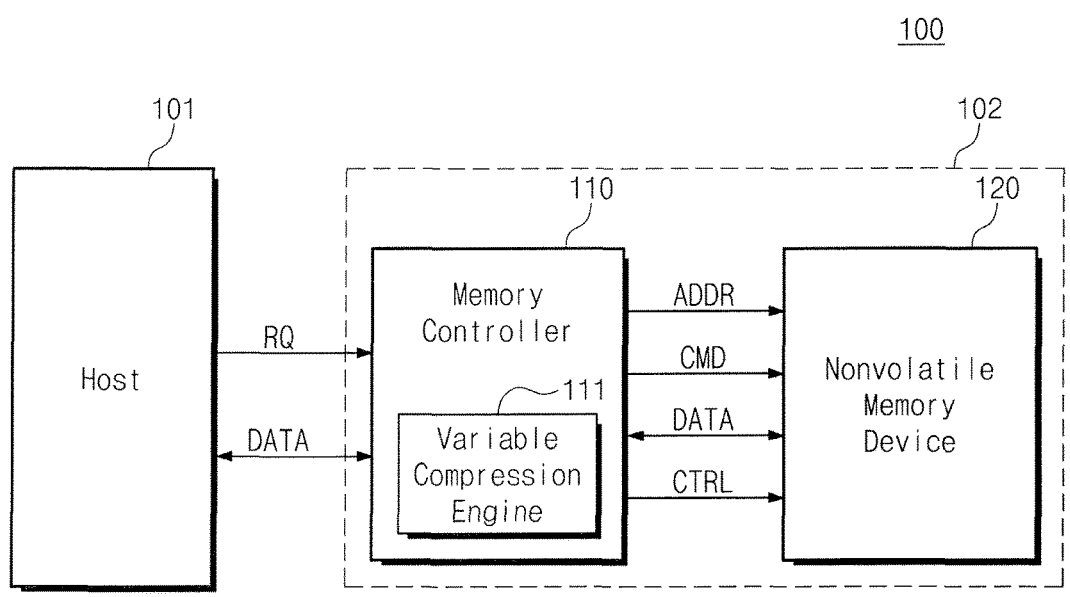
FIG. 1 is a block diagram illustrating a user device, according to an embodiment of the inventive concept.

FIG. 1 is a block diagram illustrating a user device, according to an embodiment of the inventive concept. Referring to FIG. 1, a user device 100 may include a host 101 and a storage device 102. In an embodiment, the user device 100 may be, for example, a computing system or an information processing system, such as a computer, a notebook, a server, a workstation, a portable communication terminal, a personal digital assistant (PDA), a portable multimedia player (PMP), a smartphone, or a wearable device.

The host 101 may write data in the storage device 102 or may read data written in the storage device 102 via an interface. In an embodiment, the host 101 may be an integrated circuit that controls overall operations of the user device 100, such as a central processing unit (CPU) or an application processor (AP).

In an embodiment, the interface may include at least one of various communication interfaces such as, but not limited to, a double data rate (DDR) interface, an universal serial bus (USB) interface, a multimedia card (MMC) interface, an embedded MMC interface, a peripheral component interconnection (PCI) interface, a PCI-express interface, an advanced technology attachment (ATA) interface, a serial-ATA interface, a parallel-ATA interface, a small computer system interface (SCSI), an enhanced small disk interface (ESDI), an integrated drive electronics (IDE) interface, a firewire interface, an universal flash storage (UFS) interface, and a nonvolatile memory express (NVMe) interface, just to name some possible non-limiting examples.

The storage device 102 may include a memory controller 110 and a nonvolatile memory device 120. In an embodiment, the storage device 102 may be a mass storage medium of the user device 100. The storage device 102 may be, for example, a mass storage medium such as a solid state drive (SSD), a USB memory, a hard disk drive, or a USB stick.

The memory controller 110 may exchange data in response to a request RQ from the host 101. For example, the memory controller 110 may read data from the nonvolatile memory device 120 in response to the request RQ from the host 101 and may provide the read data to the host 101. Alternatively, the memory controller 110 may program data received from the host 101 in the nonvolatile memory device 120 in response to the request RQ from the host 101.

In an embodiment of the inventive concept, the memory controller 110 may provide an address ADDR, a command CMD, and a control signal CTRL to the nonvolatile memory device 120 to perform the above-described operations and may exchange data with the nonvolatile memory device 120.

The nonvolatile memory device 120 may output or program data in response to signals received from the memory controller 110. In an embodiment of the inventive concept, the nonvolatile memory device 120 may include a NAND flash memory. However, the inventive concept is not limited thereto. For example, each of the memory devices may include, for example, a volatile memory, such as a static RAM (SRAM), a DRAM, or a synchronous DRAM (SDRAM), or a nonvolatile memory, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), or a ferroelectric RAM (FRAM).

In an embodiment of the inventive concept, the memory controller 110 may include a variable compression engine 111. The variable compression engine 111 may compress data to be stored in the nonvolatile memory device 120 or may decompress data stored in the nonvolatile memory device 120.

In an embodiment of the inventive concept, the variable compression engine 111 may be implemented with a software component, a hardware component, or a combination thereof. For example, the software component may be a machine executable code, firmware, an embedded code, or application software. The hardware component may be a circuit, a processor, a computer, an integrated circuit, integrated circuit cores, a pressure sensor, an inertial sensor, a microelectromechanical system (MEMS), passive elements, or a combination thereof.

In an embodiment of the inventive concept, the variable compression engine 111 may vary (e.g. change) a compression ratio based on a type of data or a data-related parameter. For example, the variable compression engine 111 may compress a first data received from the host 101 based on a first compression ratio. In this case, the first data may be write data corresponding to the request RQ (e.g., a write request) of the host 101. The variable compression engine 111 may compress a second data read from the nonvolatile memory device 120 for garbage collection based on a second compression ratio. In an embodiment, the second compression ratio may be higher than the first compression ratio.

In an embodiment of the inventive concept, the compression ratio indicates a ratio of a reduced data size to a total size of data to be compressed. For example, the size of compressed data may become smaller (e.g. decreases) as the compression ratio becomes higher (e.g. increases). However, a time to perform a compression operation may become longer as the compression ratio increases. In contrast, the size of compressed data when the compression ratio is relatively low may be relatively larger compared with the size of compressed data when the compression ratio is relatively high, while a time for the compression operation with a relatively compression ratio may be shorter.

For example, the variable compression engine 111 may apply a relatively low compression ratio to write data received from the host 101 for a fast compression operation, thereby reducing a write delay due to the compression operation. In an embodiment, the variable compression engine 111 may compress write data based on the compression ratio of "0". In an embodiment, an indication that the compression ratio is "0" may mean that the compression operation is not performed or is skipped.

Also, in an embodiment of the inventive concept, an available space of the storage device 102 may be secured by applying a relatively high compression ratio to data used in a maintenance operation of the storage device 102 such as garbage collection. In this case, since the compression operation that is performed during a garbage collection operation is performed during a background operation that is normally not perceived by a user, a reduction of performance that the user experiences may be slight. Also, since data is compressed based on a relatively high compression ratio during the garbage collection operation, throughput between the memory controller 110 and the nonvolatile memory device 120 may increase upon reading the compressed data in a data read operation later.

In an embodiment of the inventive concept, the second compression ratio may be adjusted based on parameters that are associated with the second data read from the nonvolatile memory device 120. The parameters may include, for example, a garbage collection count, an update count, a retention time, etc. that are associated with the second data.

Figure 2:
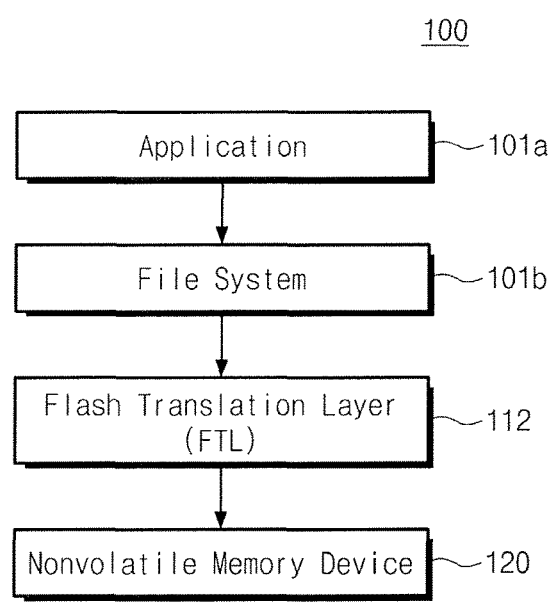
FIG. 2 is a block diagram illustrating layers of a user device of FIG. 1.

FIG. 2 is a block diagram illustrating software layers of a user device of FIG. 1. Referring to FIGS. 1 and 2, software layers of the user device 100 may include an application 101*a*, a file system 101*b*, and a flash translation layer (FTL) 112.

The application 101*a* may include various application programs that are driven (e.g. executed) by the user device 110 or the host 101. The file system 101*b* may organize files or data used by the application 101*a*. For example, the file system 101*b* may manage a storage space of the storage device 102 with logical addresses and may assign a logical address to data stored or to be stored in the storage device for management. In an embodiment, a type of the file system 101*b* may vary with the user device 100 or the operating system OS of the host 101. In an embodiment, the file system 101*b* may include, for example, a File Allocation Table (FAT), a FAT32, an NT File System (NTFS), a Hierarchical File System (HFS), a Journaled File System2 (JSF2), XFS, an On-Disk Structure-5 (ODS-5), a Universal Disk Format (UDF), a Zettabyte File System (ZFS), UFS (Unix File System), ext2, ext3, ext4, ReiserFS, Reiser4, ISO 9660, Gnome VFS, BFS, WinFS, or the like. In an embodiment, the application 101*a* and the file system 101*b* may be software layers driven on the host 101.

With continued reference to FIG. 2, the flash translation layer (FTL) 112 may perform various maintenance operations between the host 101 and the nonvolatile memory device 120 to allow the nonvolatile memory device 120 to be used efficiently. For example, the FTL 112 may perform a conversion operation between a logical address and a physical address. The logical address is information managed by the file system 101*b*, and the physical address is information indicating a physical location of the nonvolatile memory device 120, at which data is stored. The FTL 112 manages the above-described address conversion operation through a mapping table (not shown).

In an embodiment of the inventive concept, the FTL 112 may perform an operation, such as a garbage collection (GC) operation, to extend the performance and lifespan of the nonvolatile memory device 120. In an embodiment, the garbage collection may indicate an operation of securing a free memory block by rearranging or moving valid data stored in a source block to another destination block and erasing the source block.

In an embodiment of the inventive concept, the variable compression engine 111 may perform the compression operation on data programmed in the nonvolatile memory device 120 during the garbage collection operation. However, the inventive concept is not limited thereto. For example, the variable compression engine 111 may perform the compression operation on data programmed in the nonvolatile memory device 120 during any other maintenance operation.

Figure 3:
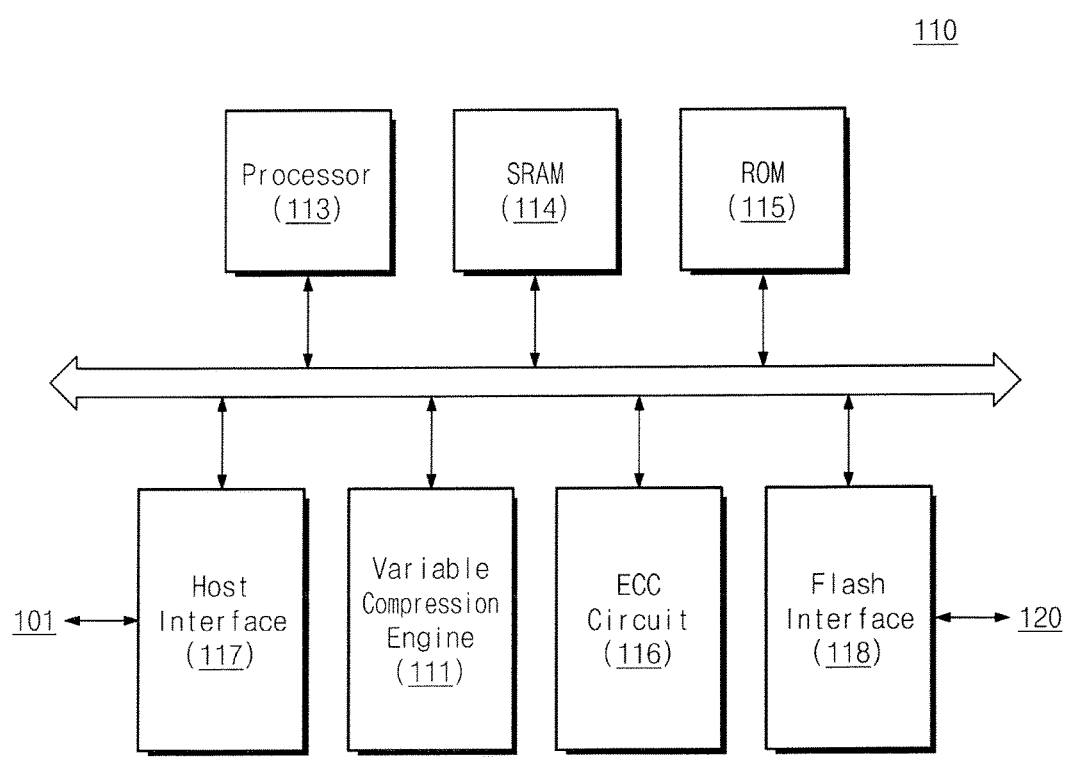
FIG. 3 is a block diagram illustrating a memory controller of FIG. 1.

FIG. 3 is a block diagram illustrating the memory controller 110 of FIG. 1. For convenience of description, some components of the memory controller 110 are illustrated in FIG. 3. However, the inventive concept is not limited thereto. For example, the memory controller 110 may further include other components including a randomizer.

Referring to FIGS. 1 and 3, the memory controller 110 may include a variable compression engine 111, a processor 113, an SRAM 114, a ROM 115, an error correction code (ECC) circuit 116, a host interface 117, and a flash interface 118. The variable compression engine 111 is described with reference to FIG. 1, and thus a detailed description thereof will not be repeated here.

The processor 113 may control the overall operation of the memory controller 110. The SRAM 114 may be used as a buffer memory, a cache memory, or a working memory of the memory controller 110. The ROM 115 may store a variety of information for the first controller 110 to operate, in the form of firmware. In an embodiment, the FTL 112 of FIG. 2 may be implemented in the form of software and may be stored in the ROM 115 or the SRAM 114. The FTL 112 that is stored in the ROM 115 or the SRAM 114 may be executed by the processor 113.

The ECC circuit 116 may detect and correct an error of data read from the nonvolatile memory device 120. For example, the ECC circuit 116 may generate an error correction code for first data received from the host 101. The received first data and the generated error correction code may be programmed in the nonvolatile memory device 120. Afterwards, when the first data is read from the nonvolatile memory device 120, the ECC circuit 116 may detect and correct an error of the read first data by using the error correction code of the first data.

In an embodiment of the inventive concept, the ECC circuit 116 may generate the error correction code before data is compressed by the variable compression engine 111. The error correction code generated by the ECC circuit 116 may be selectively compressed together with data. Alternatively, the ECC circuit 116 may generate the error correction code after data is compressed by the variable compression engine 111.

With continued reference to FIG. 3, the memory controller 110 may communicate with the host 101 through the host interface 117. In an embodiment, the host interface 117 may include at least one of various interfaces described with reference to FIG. 1. The memory controller 110 may communicate with the nonvolatile memory device 120 through the flash interface 118.

Figure 4:
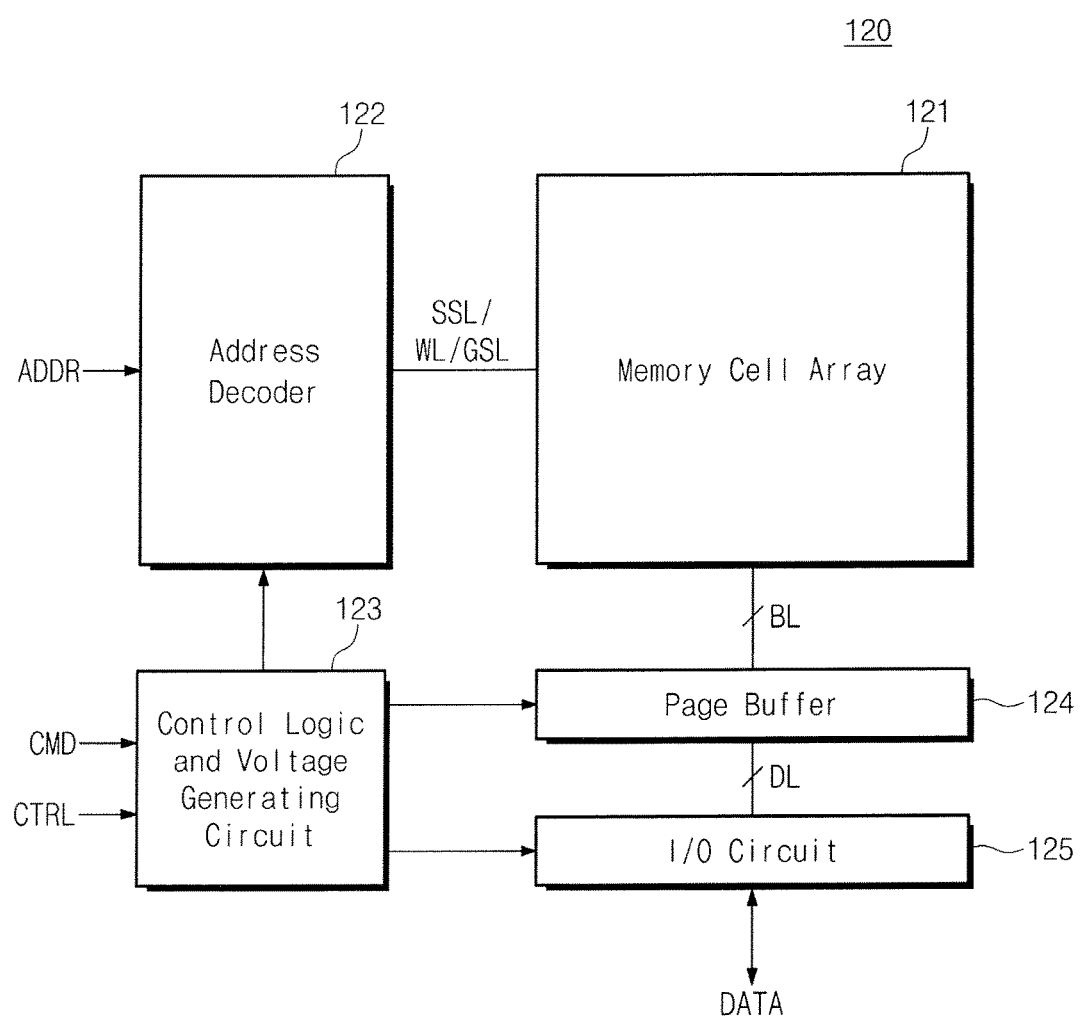
FIG. 4 is a block diagram illustrating a nonvolatile memory device of FIG. 1.

FIG. 4 is a block diagram illustrating a nonvolatile memory device 120 of FIG. 1. Referring to FIG. 4, the nonvolatile memory device 120 may include a memory cell array 121, an address decoder 122, a control logic and voltage generator circuit 123, a page buffer 124, and an input/output circuit 125.

The memory cell array 121 includes a plurality of memory blocks, each of which has a plurality of memory cells. The memory cells may be connected with a plurality of word lines WL. Each memory cell may be a single level cell (SLC) storing one bit or a multi-level cell (MLC) storing at least two bits.

The address decoder 122 may be connected with the memory cell array 121 through string selection lines SSL, the word lines WL, and ground selection lines GSL. The address decoder 122 may receive an address ADDR from the memory controller 110. The address decoder 122 may decode the received address ADDR and may select at least one of the word lines based on the decoded address. The address decoder 122 may provide various voltages with the selected word line.

The control logic and voltage generator circuit 123 may be configured to control the address decoder 122, the page buffer 124, and the input/output circuit 125 in response to a command CMD and a control signal CTRL from the memory controller 110.

The control logic and voltage generator circuit 123 may generate various voltages for the operation of nonvolatile memory 120. For example, the control logic and voltage generator circuit 123 may generate a plurality of selection read voltages, a plurality of non-selection read voltages, a plurality of program voltages, a plurality of pass voltages, a plurality of program verification voltages, a plurality of erase voltages, a plurality of word line erase voltages, a plurality of erase verification voltages, etc.

The page buffer 124 is connected with the memory cell array 121 through the bit lines BL. The page buffer 124 may temporarily store data to be stored in the memory cell array 121 or data read from the memory cell array 121.

The input/output circuit 125 may be connected with the page buffer 124 through data lines DL and may exchange data with the page buffer 124 through the data lines DL. Under control of the control logic and voltage generator circuit 123, the input/output circuit 125 may transmit data to the memory controller 110 or may receive data from the memory controller 110.

Figure 5:
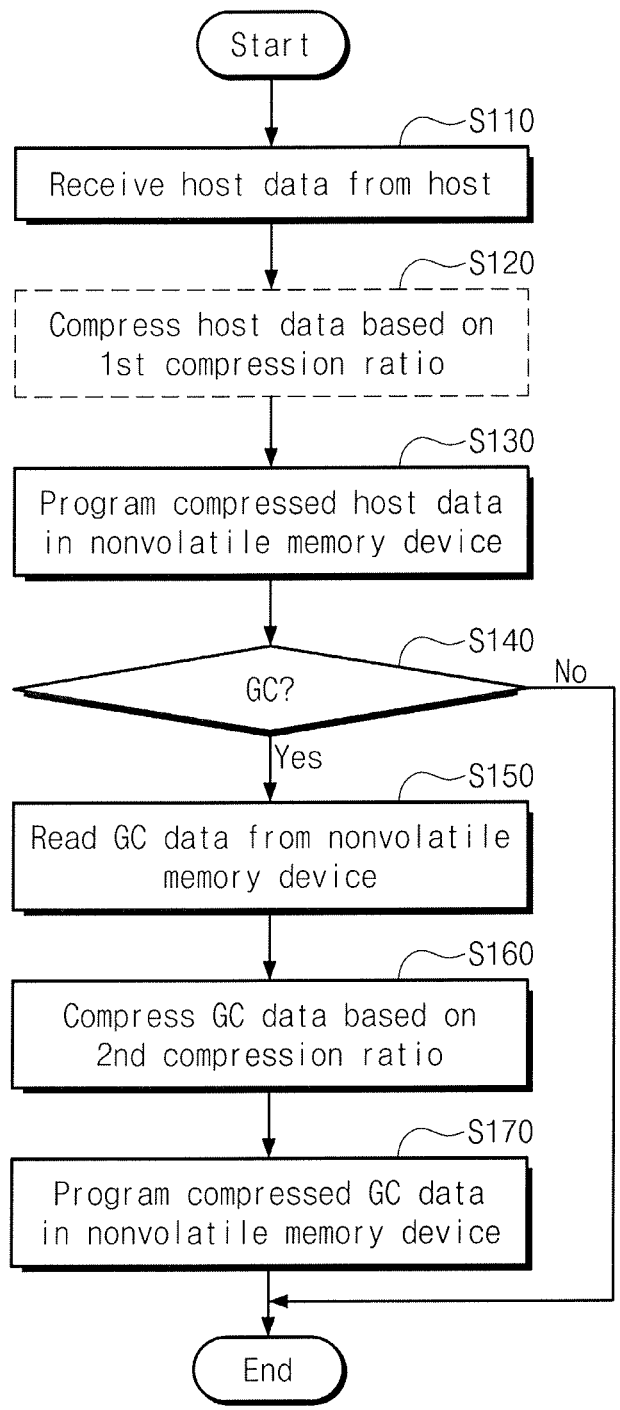
FIG. 5 is a flowchart illustrating a method of variably compressing data, according to an embodiment of the inventive concept.

FIG. 5 is a flowchart illustrating a method of variably compressing data, according to an embodiment of the inventive concept. For a brief description, a method of variably compressing data according to an embodiment of the inventive concept is described with reference to the memory controller 110. However, the inventive concept is not limited to the embodiment discussed herein. For example, the variable compression method may be performed through a separate hardware component or by a separate software component.

With regard to FIG. 5, a person of ordinary skill in the art should appreciate that data received from the host 101 for a write operation corresponding to the request RQ of the host 101 may be referred to as "host data". Also, data that are read from the nonvolatile memory device 120 for garbage collection is referred to as "garbage collection (GC) data". However, the inventive concept is not limited thereto. For example, the GC data may indicate data for another operation of the host 101 or the memory controller 110 as well as data for the garbage collection.

Referring to FIGS. 1 and 5, in operation S110, the memory controller 110 may receive host data from the host 101. For example, the memory controller 110 may receive the request RQ for writing data in the storage device 102 and the host data from the host 101. Alternatively, the memory controller 110 may receive a request to read data in the storage device 102.

In operation S120, the memory controller 110 may compress the host data based on a first compression ratio. For example, the variable compression engine 111 of the memory controller 110 may compress the host data based on the first compression ratio. The first compression ratio may be stored in the nonvolatile memory device 120. In addition, if the first compression ratio is 0, or is skipped, there may not be compression of the host data, and the received host data would be written in the storage device 102 without a compression operation.

In operation S130, the memory controller 110 may program the compressed host data in the nonvolatile memory device 120.

In an embodiment, the memory controller 110 may program (e.g. write) the host data, which has been compressed according to the first compression ratio, in the nonvolatile memory device 120 by repeatedly performing operation S110 to operation S130.

In an embodiment, if operation S120 is skipped, or the first compression ratio is set to "0", the memory controller 110 may program uncompressed host data (e.g., raw data) in the nonvolatile memory device 120 without performing a compression operation on the host data.

In operation S140, the memory controller 110 may determine whether the garbage collection operation is to be performed. For example, the FTL 112 of the memory controller 110 may be configured to perform the garbage collection operation under a specific condition. For example, the specific condition may include conditions such as the case where the number of free memory blocks of the nonvolatile memory device 120 is not more than a reference value, or the case where the storage device 102 is in an idle state, and/or the case where the size of invalid data stored in a specific memory block is not less than a reference size. In an embodiment, the specific condition during which garbage collection is performed may further include various operating conditions without being limited to the above-described conditions.

If it is determined in operation S140 that the garbage collection operation is to be performed, then in operation S150, the memory controller 110 may read GC data from the nonvolatile memory device 120. In an embodiment, the GC data may be read from a source block selected by the FTL 112. The GC data may be data having a size of a page unit, a word line unit, or a memory block unit defined by the nonvolatile memory device 120.

In operation S160, the memory controller 110 may compress the GC data based on a second compression ratio. For example, the variable compression engine 111 of the memory controller 110 may compress the GC data based on the second compression ratio. In an embodiment, the second compression ratio used in operation S160 may be higher than the first compression ratio used in operation S120. As a result, a higher compression ratio may result in a smaller data size. For example, in the case where the size of the host data is the same as that of the GC data, the size of GC data compressed based on the second compression ratio may be smaller than the size of host data compressed based on the first compression ratio. In operation S170, the memory controller 110 may program the compressed GC data in the nonvolatile memory device 120.

Figure 6:
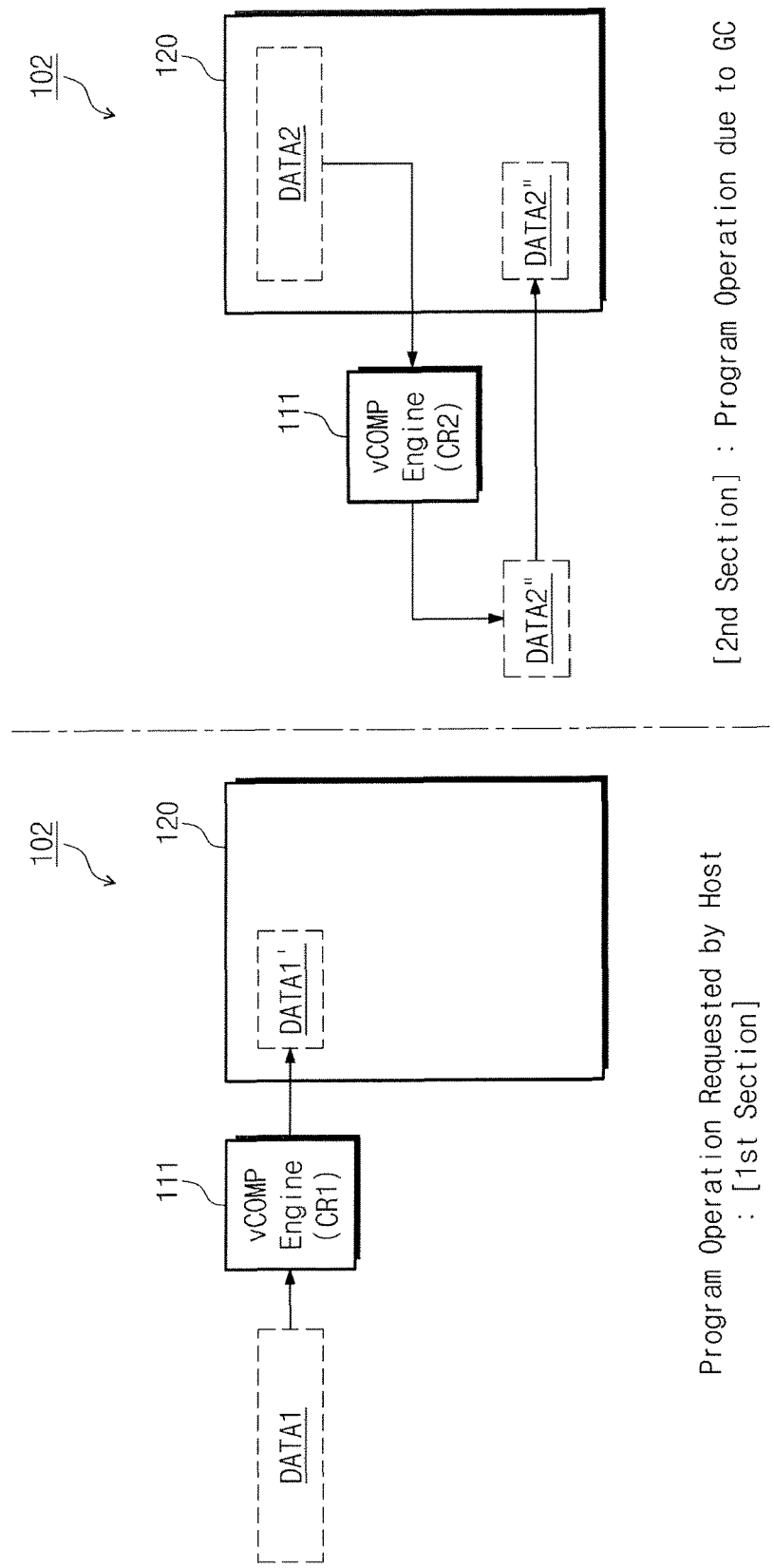
FIG. 6 illustrates an operation in which a memory controller of FIG. 5 variably compresses data.

FIG. 6 shows drawings for describing an operation in which a memory controller of FIG. 5 variably compresses data. For ease of illustration, some components may be omitted if their inclusion could obscure an artisan's appreciation of a variable compression operation according to the inventive concept.

Referring to FIGS. 1, 5, and 6, a first section of FIG. 6 illustrates an example of a write operation requested by the host 101. As illustrated in the first section of FIG. 6, the variable compression engine 111 may compress first data DATA1 received from the host 101 based on a first compression ratio CR1. The compressed first data DATA1' may be programmed in the nonvolatile memory device 120.

Moreover, a second section of FIG. 6 illustrates an example of a program operation that is performed during the garbage collection GC. As illustrated in the second section of FIG. 6, the variable compression engine 111 may compress a second data DATA2 read from the nonvolatile memory device 120 based on second compression ratio CR2. The compressed second data DATA2" may be programmed in the nonvolatile memory device 120 (in more detail, a target block).

As described above, the first compression ratio CR1 may be lower than the second compression ratio CR2. In general, a time to perform a compression operation becomes shorter as a compression ratio become lower. Thus, there is a positive correlation between the compression ratio and the time to perform the compression operation. In addition, during a write operation that is performed according to a request of the host 101, data may be compressed based on a relatively low compression ratio, and thus a write delay due to the compression operation may be reduced.

In addition, when the size of the first data DATA1 is the same as that of the second data DATA2, the size of the second data DATA2 compressed according to the second compression ratio CR2 may be smaller than the size of the first data DATA1 compressed according to the first compression ratio CR1. For example, an available space of the storage device 102 may be increased by making the compression ratio higher during the garbage collection operation. On the other hand, if the compression ratio is lower during the garbage collection, the data will occupy more storage space, and the available space of the storage device may be decreased with the lower compression ratio. Thus, a storage device with enhanced performance and an increased available capacity is provided.

Figure 7:
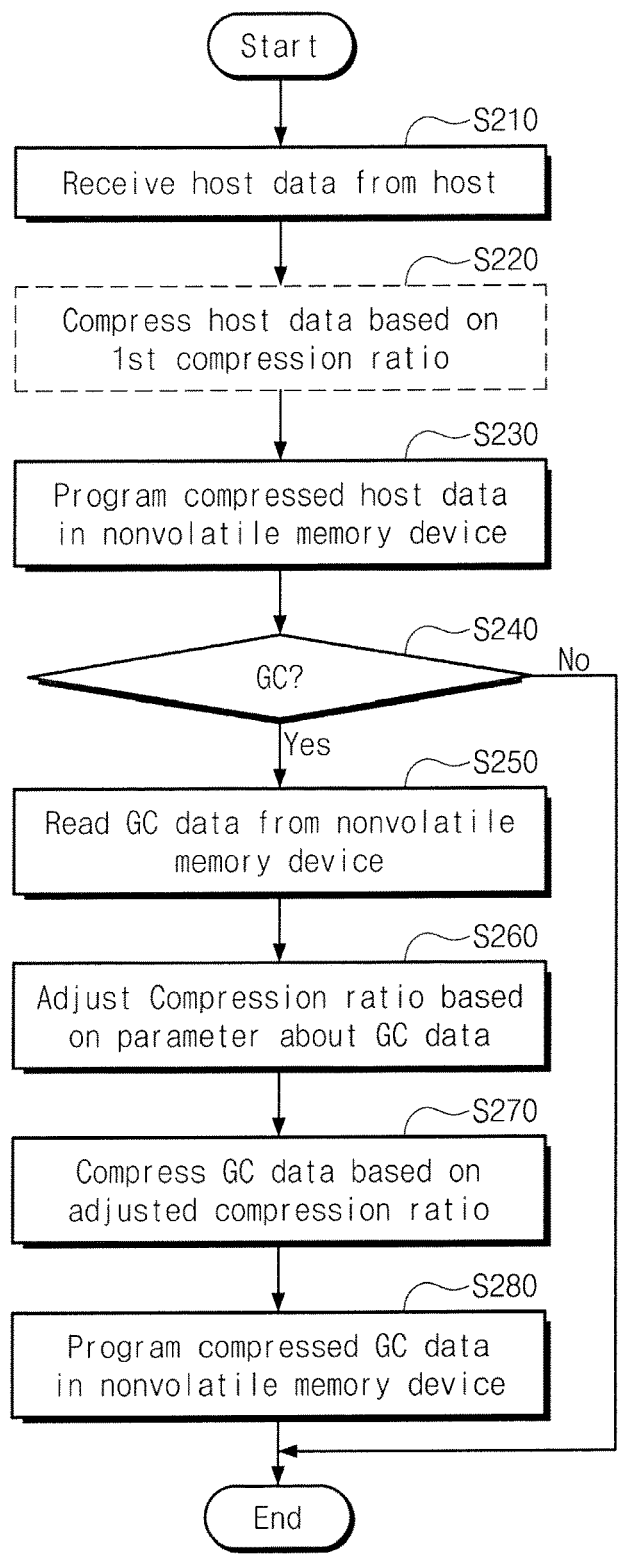
FIG. 7 is a flowchart illustrating a method of variably compressing data, according to an embodiment of the inventive concept.

FIG. 7 is a flowchart illustrating a method of variably compressing data, according to an embodiment of the inventive concept. For a brief description, according to an embodiment of the inventive concept, a method of variably compressing data is described with reference to the memory controller 110. However, the inventive concept is not limited to the description of FIG. 7. For example, the variable compression method may be performed through a separate hardware component, or a separate software component.

Referring to FIGS. 1 and 7, the memory controller 110 may perform operations S210 to S250. With regard to FIG. 7, operations S210, S220, S230, S240 and S250 may be similar to operations S110 to S150 of FIG. 5, and a detailed description thereof is omitted.

In operation S260, the memory controller 110 may adjust a compression ratio based on parameters of GC data. For example, the parameters of the GC data may include information about the GC data, such as a garbage collection count, an update count, and a retention time. The variable compression engine 111 may adjust a compression ratio based on the above-described parameters.

For example, in an embodiment, the compression ratio may be adjusted to become higher as the garbage collection count of the GC data becomes greater. Alternatively, the compression ratio may be adjusted to become lower as the update count of the GC data becomes greater. Alternatively, the compression ratio may be adjusted to become higher as the data retention time becomes longer.

Moreover, in a case where the garbage collection count of the GC data is relatively high, the update count of the GC data is relatively small, or the data retention time is relatively long means that deleting or updating of data is not frequently generated. Accordingly, an available space of the storage device 102 may be increased by making a compression ratio of GC data higher. Since the GC data is not frequently updated, power consumption may be reduced due to data compression and to use a compression time efficiently.

For example, in the case where GC data that are compressed with a high compression ratio is updated or deleted, a compression effect (e.g. securing of an available space) may be impacted, and thus the power and time for a compression operation may be inefficiently expended. However, as described above, in the case where the number of times of deletion or update of the GC data is small, a compression effect may be maintained for a relatively long time, and power and time for the compression operation may be efficiently used.

With continued reference to FIG. 7, in operation S270, the memory controller 110 may compress the GC data based on the adjusted compression ratio. In operation S280, the memory controller 110 may program the compressed GC data in the nonvolatile memory device 120. Operation S270 and operation S280 may be similar to operation S160 and operation S170 of FIG. 5, and a detailed description thereof is thus omitted.

As described above, according to an embodiment of the inventive concept, the variable compression engine 111 may adjust a compression ratio of GC data based on various parameters (e.g., a GC count, an update count, and a retention time) of the GC data. Accordingly, since power and time for data compression are more efficiently used by adjusting the compression ratio, an effect obtained through data compression may be maximized.

Figure 8:
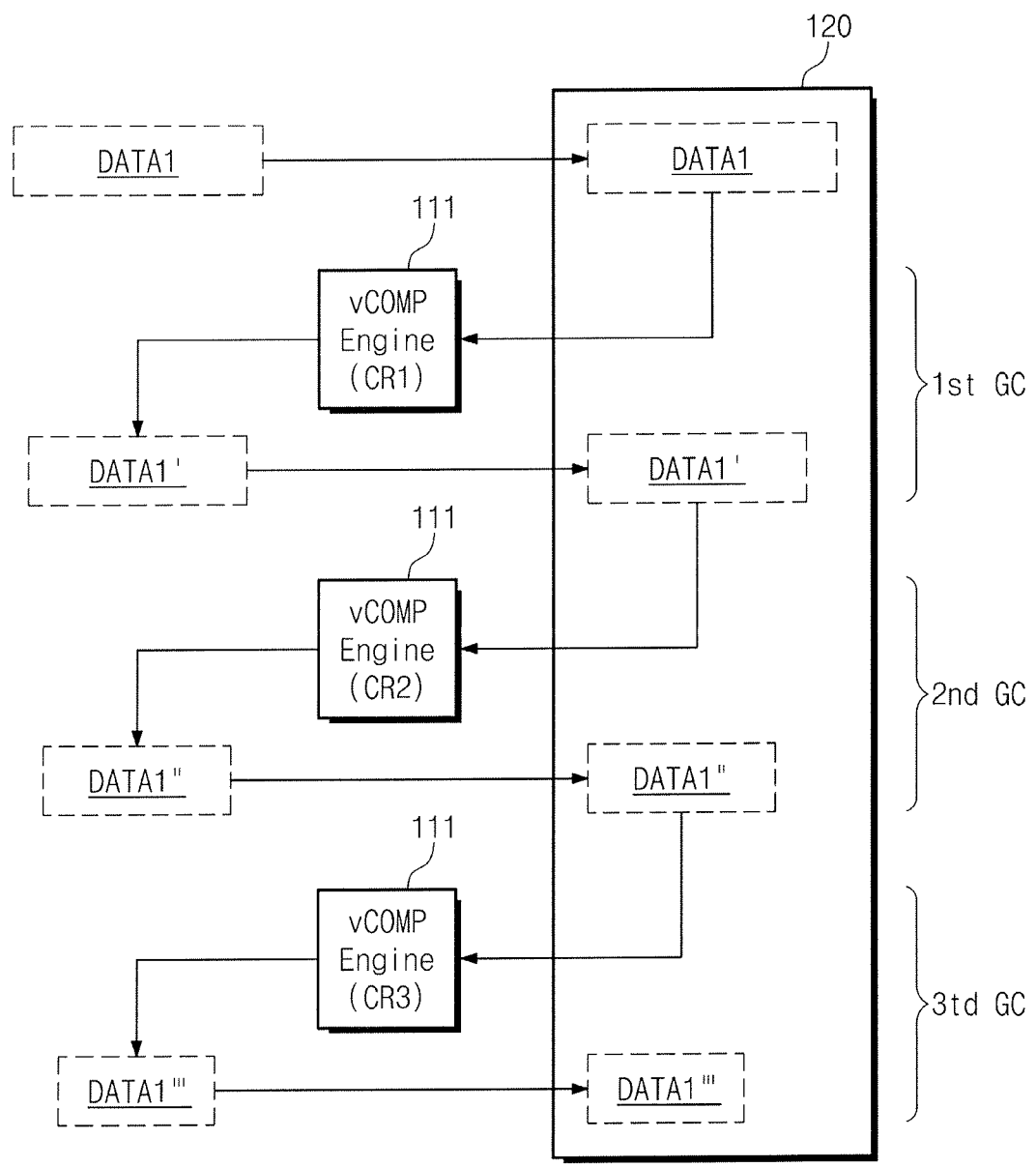
FIGS. 8 and 9 are block diagrams describing an operation S260 of FIG. 7.
Figure 9:
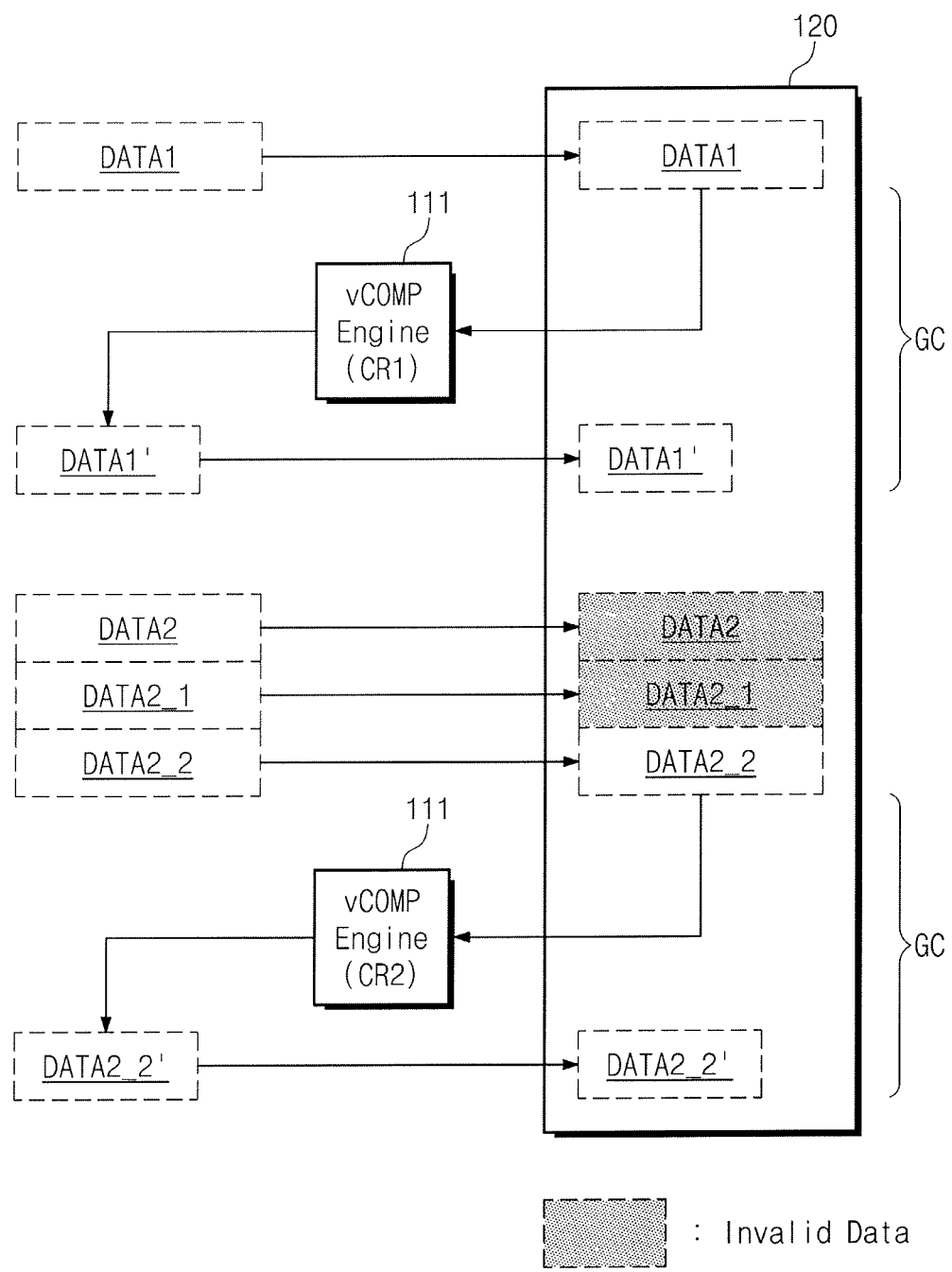

FIGS. 8 and 9 are block diagrams that illustrate the compression adjustment operation (operation S260) of FIG. 7. For ease of illustration and to prevent obscuring an artisan's appreciation of the inventive concept, the block diagrams may have omitted certain components of the storage device.

Also, for ease of illustration, it is assumed that host data (i.e., the first data DATA1) for a write operation requested by the host 101 is stored in the nonvolatile memory device 120 without compression (in other words, with a compression ratio of "0"). However, the inventive concept is not limited thereto, as host data requested by the host data may be stored as compressed data.

Also, in FIGS. 8 and 9, a plurality of data DATA1, DATA1', DATA1", and DATA1'" are stored in the nonvolatile memory device 120. However, the drawing are provided for illustrative purposes, and some of the plurality of data DATA1, DATA1', DATA1", and DATA1'" may be invalidated or removed according to a data flow or a flow of a garbage collection operation. In addition, although not illustrated in FIGS. 8 and 9, the plurality of data DATA1, DATA1', DATA1" and DATA1'" may be stored in different memory blocks, respectively.

In addition, an operation of adjusting a compression ratio based on one unit data (e.g., the first data DATA1) will be described. However, in an actual garbage collection operation, a plurality of unit data may be read from the nonvolatile memory device 120 and may be programmed in the nonvolatile memory device 120.

Referring to FIGS. 1, 2, 7, and 8, the first data DATA1 from the host 101 may be programmed in the nonvolatile memory device 120. The FTL 112 of the memory controller 110 may select a memory block, in which the first data DATA1 are stored, as a source block to perform a garbage collection operation.

For example, in a first garbage collection operation GC1, the first data DATA1 may be read from the nonvolatile memory device 120. For example, a garbage collection count of the read first data DATA1 may be "0". In this case, the variable compression engine 111 may compress the first data DATA1 based on a first compression ratio CR1. The compressed first data DATA1' may be programmed in the nonvolatile memory device 120 during the first garbage collection operation GC1.

In a second garbage collection operation GC2, the FTL 112 may select a memory block, in which the compressed first data DATA1' are stored, as a source block. In the second garbage collection operation GC2, the compressed first data DATA1' may be read from the nonvolatile memory device 120. In this case, a garbage collection count of the compressed first data DATA1' may be "1".

In an embodiment, based on a value of the garbage collection count, the variable compression engine 111 may compress the compressed first data DATA1' again based on a second compression ratio CR2. In an embodiment, the second compression ratio CR2 may be higher than the first compression ratio CR1. In an embodiment, the operation of compressing stored data that was previously compressed data again may include an operation of decompressing the previously-compressed data, followed by an operation of compressing the decompressed data. The re-compressed first data DATA1" may be programmed in the nonvolatile memory device 120 during the second garbage collection operation GC2.

Afterwards, in a third garbage collection operation GC3, the FTL 112 may select a memory block, in which the re-compressed first data DATA1" are stored, as a source block. In the third garbage collection operation GC3, the re-compressed first data DATA1" may be read from the nonvolatile memory device 120. In this case, a garbage collection count of the re-compressed first data DATA1" may be "2". In an embodiment, the variable compression engine 111 may compress the re-compressed first data DATA1" again based on a third compression ratio CR3. The third compression ratio CR3 may be higher than the first and second compression ratios CR1 and CR2. The re-compressed first data DATA1'" may be programmed in the nonvolatile memory device 120 during the third garbage collection operation GC3.

As described above, the variable compression engine 111 may increase the compression ratio CR as a garbage collection count of GC data increases. Accordingly, an available space of the storage device 120 may be efficiently secured.

An artisan should understand and appreciate that while the aforementioned description included an adjustment operation of decompressing compressed data each time the GC count increased, followed by a compression operation of the decompressed data with a higher compression ratio than previously applied to the data, the inventive concept is not limited to the aforementioned example.

For example, there can be a threshold quantity of GC counts set (the quantity may be greater than 1) at which a compression of the second data is performed. For example, if the threshold quantity for a GC count is set to two, then during or after the second GC operation is performed, a compression of the second data occurs. Resources expended to perform a compression (and a decompression) may be reduced by setting a larger threshold between counts. Referring to, for example, to the flowchart in FIG. 5, S140 may determine whether a GC count has reached a threshold quantity, and if the answer is affirmative (threshold has been reached) proceed with S150. Otherwise, the operation ends similar to FIG. 5 if the answer is no regarding a threshold quantity. A respective threshold quantity may be set for an update count as well for the garbage collection.

It is also within the inventive concept that the based on the amount of available space in the storage device, the threshold quantity of actions to perform the second compression can be increased or reduced. For example, if the available space of the storage device is less than a certain percentage of capacity, there can be more frequent compression operations (a lower threshold quantity of GC counts to perform the second compression operation). In addition, the rate of the second compression may also increase as the available storage space decreases.

Next, referring to FIGS. 1, 2, 7, and 9, the first data DATA1 from the host 101 may be programmed in the nonvolatile memory device 120. The FTL 112 of the memory controller 110 may select a memory block, in which the first data DATA1 are stored, as a source block to perform a garbage collection operation.

In the garbage collection operation, the first data DATA1 may be read from the nonvolatile memory device 120. For example, an update count of the read first data DATA1 may be "0". In an embodiment, the variable compression engine 111 may compress the first data DATA1 based on the first compression ratio CR1. The compressed first data DATA1' may be programmed in the nonvolatile memory device 120 during the first garbage collection operation GC1.

Next, the second data DATA2 from the host 101 may be programmed in the nonvolatile memory device 120. Afterwards, the second data DATA2 may be updated with data DATA2_1 from the host 101. In this case, the second data DATA2 stored in the nonvolatile memory device 120 may be invalidated.

Afterwards, the data DATA2_1 may be updated with data DATA2_2 from the host 101. In this case, the data DATA2_1 stored in the nonvolatile memory device 120 may be invalidated.

Afterwards, the FTL 112 of the memory controller 110 may select a memory block, in which the data DATA2_2 are stored, as a source block to perform a garbage collection operation. In the garbage collection operation, the data DATA2_2 may be read from the nonvolatile memory device 120. According to the above description, an update count of the data DATA2_2 may be "2". This means that the data DATA2_2 are updated twice.

The variable compression engine 111 may compress the data DATA2_2 based on the second compression ratio CR2. The compressed data DATA2_2' may be programmed in the nonvolatile memory device 120. In an embodiment, the second compression ratio CR2 may be lower than the first compression ratio CR1. For example, the variable compression engine 111 may decrease the compression ratio as the update count of GC data increases.

As described above, there are reduced power and compression time to update compressed GC data by decreasing a compression ratio as the update count of the GC data increases.

Although in the aforementioned paragraph the variable compression engine may decrease the compression ratio as the update count of the GC data increases, a count interval may be set for triggering a compression operation. For example, the memory controller can be configured to have an interval between GC counts that triggers a compression operation.

Although not illustrated in FIGS. 8 and 9, the variable compression engine 111 may adjust the compression ratio based on a retention time of the GC data. For example, the variable compression engine 111 may increase the compression ratio as a time when the GC data is stored in the nonvolatile memory device 120 increases.

Although not illustrated in drawings, the variable compression engine 111 may adjust the compression ratio based on read count of the GC data. For example, the variable compression engine 111 may decrease the compression ratio as a read count of the GC data increases.

As described with reference to FIGS. 7 to 9, the variable compression engine 111 may prevent power consumption by a GC data update or deletion or a compression time from being inefficiently used, by adjusting the compression ratio based on various parameters (e.g., a GC count, an update count, and a retention time) of the GC data.

FIG. 10 is a diagram illustrating information managed by a memory controller. Referring to FIGS. 1 and 10, the memory controller 110 may manage information illustrated in FIG. 10. For example, the FTL 112 of the memory controller 110 may manage information about a GC count, an update count, and a retention time of each of a plurality of data DATA1 to DATAn. The information about each of the plurality of data DATA1 to DATAn may be updated, for example, according to an operation of the storage device 102 or an operation of the FTL 112.

For example, the FTL 112 may manage a first to n-th garbage collection counts GC_1 to GC_n, a first to n-th update counts UC_1 to UC_n, and a first to n-th retention times RT_1 to RT_n of the plurality of data DATA1 to DATAn. The first to n-th garbage collection counts GC_1 to GC_n respectively correspond to garbage collection counts of the plurality of data DATA1 to DATAn, the first to n-th update counts UC_1 to UC_n respectively correspond to update counts of the plurality of data DATA1 to DATAn, and the first to n-th retention times RT_1 to RT_n respectively correspond to retention times of the plurality of data DATA1 to DATAn. In an embodiment, the retention time may refer to a time when data is retained in the nonvolatile memory device 120 without an update or a deletion operation.

In an embodiment, the variable compression engine 111 may adjust a compression ratio of data (in particular, GC data) based on the information illustrated in FIG. 10.

Figure 11:
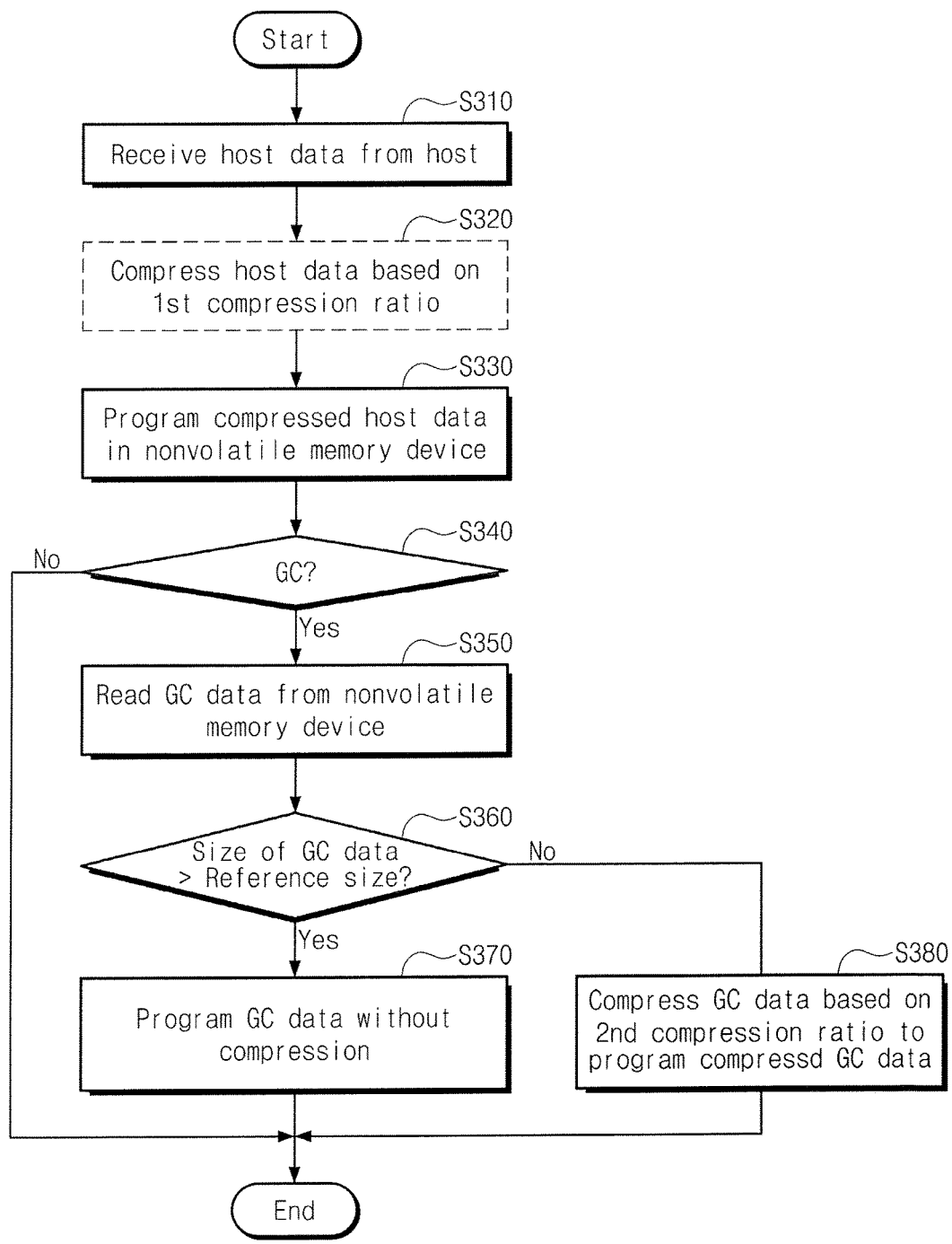
FIG. 11 is a flowchart illustrating a method of variably compressing data, according to an embodiment of the inventive concept.

FIG. 11 is a flowchart illustrating a method of variably compressing data, according to an embodiment of the inventive concept. For brevity, according to an embodiment of the inventive concept, a method of variably compressing data is described with reference to the memory controller 110. However, the inventive concept is not limited thereto. For example, the variable compression method may be performed through a separate hardware component or a separate software component.

Referring to FIGS. 1 and 11, the memory controller 110 may perform operation S310 to operation S350. Operation S310 to operation S350 may be similar to operation S110 to operation S150 of FIG. 5 or operation S210 to operation S250 of FIG. 7, and a detailed description thereof is thus omitted.

In operation S360, the memory controller 110 may determine whether the size of GC data is greater than a reference size. For example, if the size of the GC data is greater than a specific size, overhead may occur upon compressing data. The overhead may cause issues due to a data compression time, such as reduction in performance or increase in power consumption.

For example, if the size of the GC data is greater than the reference size, in operation S370, the memory controller 110 may program the GC data in the nonvolatile memory device 120 without compression.

If the size of the GC data is less than the reference size, the memory controller 110 performs operation S380 to compress the GC data based on a second compression ratio CR2. Operation S380 may be similar to operation S160 and operation S170 of FIG. 5, or operation S260 to operation S280 of FIG. 7, and a detailed description thereof is thus omitted.

As described above, an available capacity of the storage device 120 may be secured by adjusting a compression ratio to perform a compression operation when the size of the GC data is less than the reference size. Also, overhead due to the compression operation may be reduced by skipping the compression operation when the size of the GC data is greater than the reference size.

Figure 12:
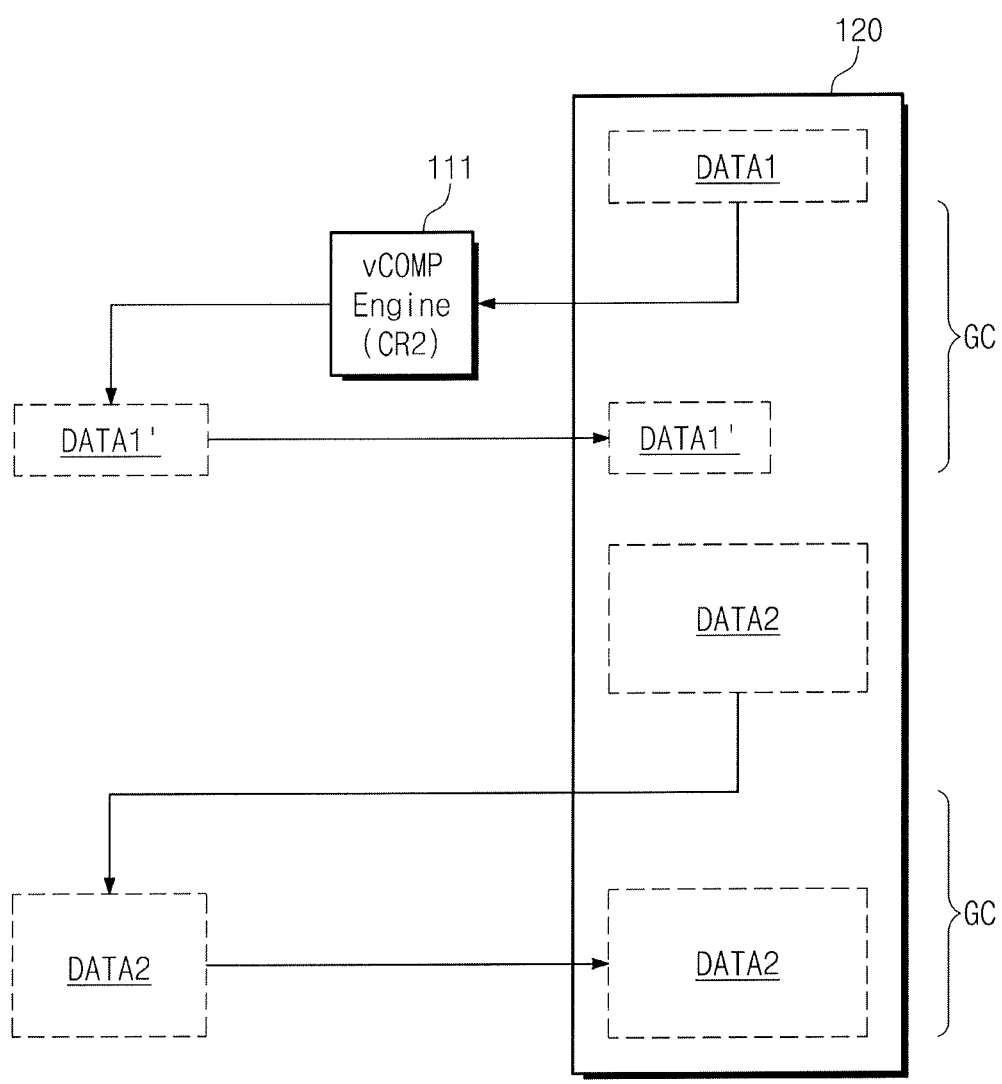
FIG. 12 is a diagram illustrating a variable compression method of FIG. 11.

FIG. 12 is a diagram for describing a variable compression method of FIG. 11. For ease of illustration and description, components that may be unrelated to describe a variable compression method of FIG. 11 are omitted.

Referring to FIGS. 1, 2, 11, and 12, garbage collection GC may be performed on the first data DATA1 stored in the nonvolatile memory device 120. For example, the FTL 112 of the memory controller 110 may select a memory block, in which the first data DATA1 are stored, as a source block such that the first data DATA1 are read from the nonvolatile memory device 120. The size of the first data DATA1 may be smaller than the reference size. In this case, as described above, the variable compression engine 111 may compress the first data DATA1 based on the second compression ratio CR2, and the compressed data DATA1' may be written in the nonvolatile memory device 120 during the garbage collection operation GC.

In an embodiment, the second compression ratio CR2 may be adjusted based on various parameters of the first data DATA1.

As another example, the garbage collection GC may be performed on the second data DATA2 stored in the nonvolatile memory device 120. For example, the FTL 112 of the memory controller 110 may select a memory block, in which the second data DATA2 are stored, as a source block such that the second data DATA2 are read from the nonvolatile memory device 120. The size of the second data DATA2 may be greater than a reference size. The reference size may be predetermined, and/or may be set by a user. In this case, as described above, the variable compression engine 111 may not perform a separate compression operation. For example, the second data DATA2 may be programmed in the nonvolatile memory device 120 without separate compression.

As described above, overhead due to data compression may be reduced by skipping the compression operation when the size of the GC data is greater than the reference size.

In an embodiment, although not illustrated in FIG. 12, the variable compression engine 111 may variably adjust the compression ratio based on the size of the GC data. For example, the variable compression engine 111 may adjust the compression ratio such that the compression ratio is inversely proportional to the size to the GC data. For example, the variable compression engine 111 may adjust the compression ratio such that the compression ratio becomes lower as the size of the GC data becomes greater (increases).

Figure 13:
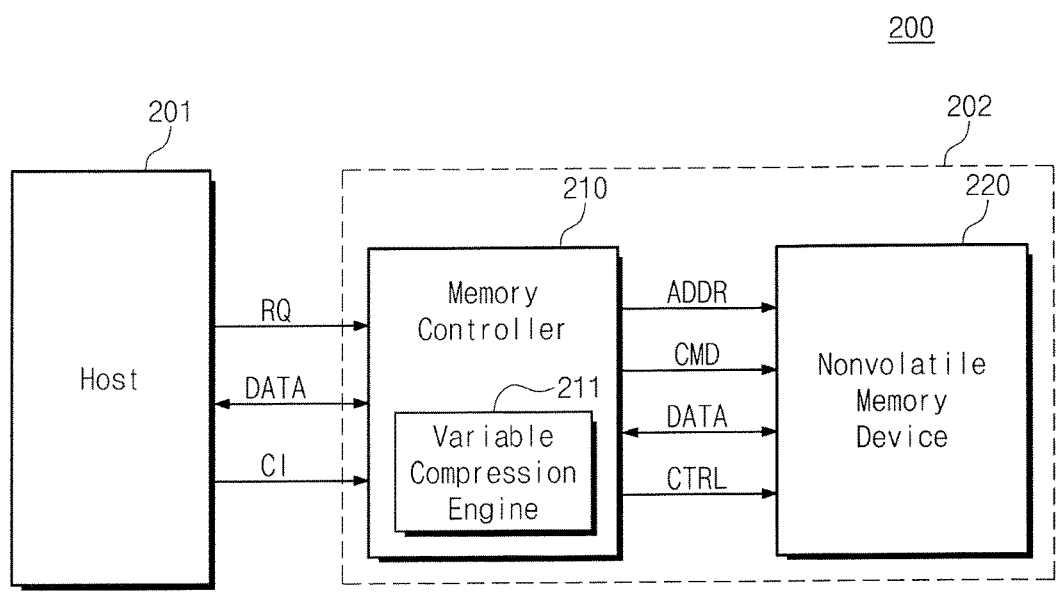
FIG. 13 is a block diagram illustrating a user device according to an embodiment of the inventive concept.

FIG. 13 is a block diagram illustrating a user device, according to an embodiment of the inventive concept. Referring to FIG. 13, a user device 200 may include a host 201 and a storage device 202. The storage device 202 may include a memory controller 210 and a nonvolatile memory device 220. The memory controller 210 may include a variable compression engine 211. The host 201, the storage device 202, the memory controller 210, the nonvolatile memory device 220, and the variable compression engine 211 are described above with regard to FIG. 1, and thus a detailed description thereof is omitted.

While the embodiment disclosed in FIGS. 1 to 12 may adjust a compression ratio in a maintenance operation (e.g., garbage collection) by the memory controller 110, the embodiment of FIG. 13 may perform a variable compression operation based on a separate compression information CI from the host 201.

For example, when a storage space of the storage device 202 is insufficient, the host 201 may request the storage device 202 to compress data stored in the storage device 202. In this case, the host 201 may provide the compression information CI to the storage device 202, and the storage device 202 may perform the variable compression operation described with reference to FIGS. 1 to 12 in response to the received compression information CI.

Although not illustrated in FIG. 13, the storage device 202 may include a timer (not shown) and may be configured to perform the above-described variable compression operation at a specific time interval. A storage space of the storage device 202 may be secured through the above-described variable compression operation.

In an embodiment, the storage device 202 may be configured to perform the above-described variable compression operation when an available capacity of the nonvolatile memory device 220 is not greater than a reference size. The storage device 202 may maintain an available capacity of the nonvolatile memory device 220 to be greater than or equal to the reference size, through the above-described variable compression operation.

Figure 14:
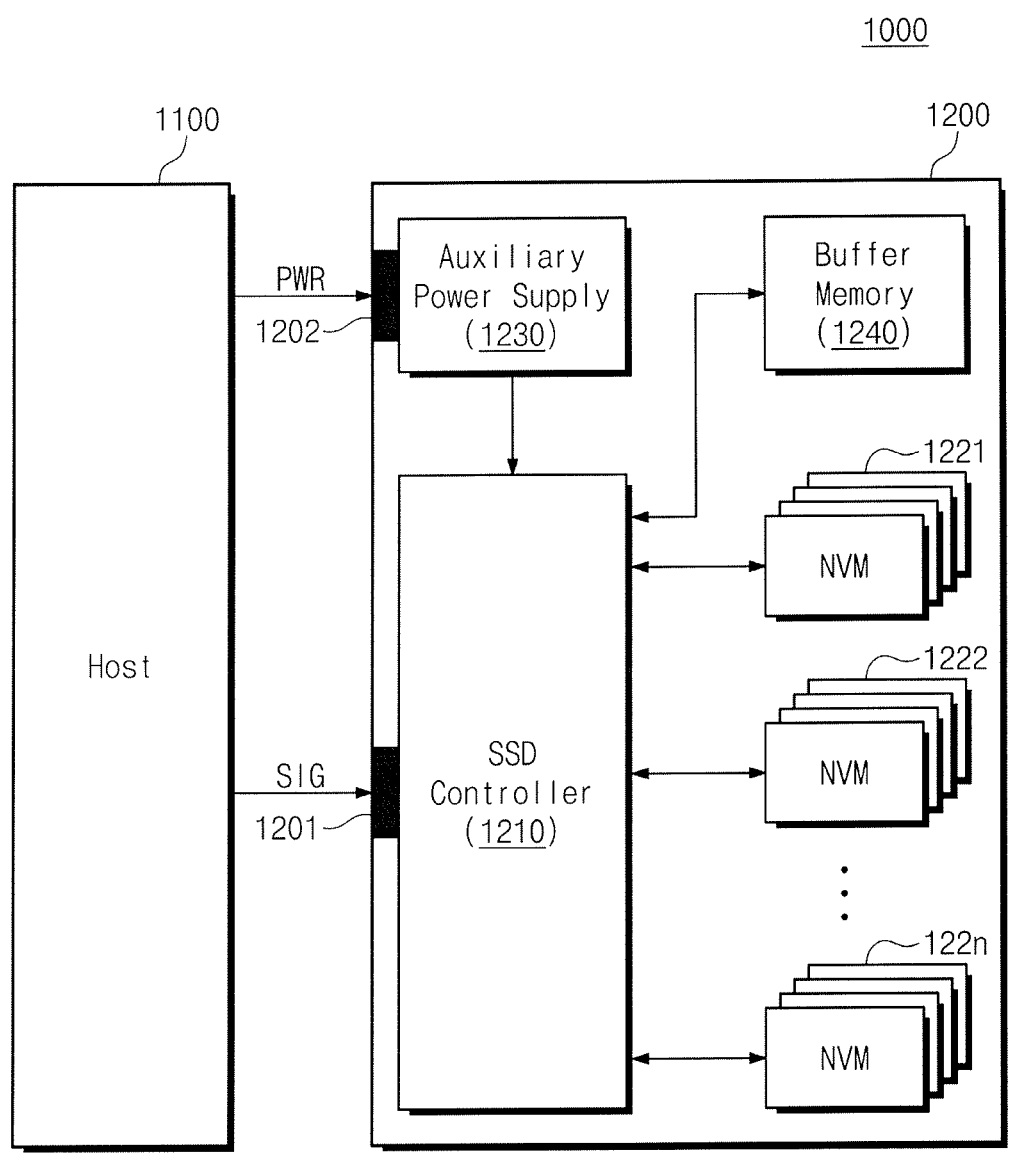
FIG. 14 is a block diagram illustrating a solid state drive system, according to an embodiment of the inventive concept.

FIG. 14 is a block diagram illustrating a solid state drive (SSD) system, according to an embodiment of the inventive concept. Referring to FIG. 14, an SSD system 1000 may include a host 1100 and an SSD 1200.

The SSD 1200 may exchange signals with the host 1100 through a signal connector 1201 and may be supplied with electric power PWR through a power connector 1202. The SSD 1200 includes an SSD controller 1210, a plurality of flash memories 1221 to 122n, an auxiliary power supply 1230, and a buffer memory 1240.

The SSD controller 1210 may control the flash memories 1221 to 122n in response to a signal SIG from the host 2100. The flash memories 1221 to 122n may operate under control of the SSD controller 1210. In an embodiment, the SSD controller 1210 may include a variable compression engine (not illustrated). The SSD controller 1210 may perform a variable compression operation based on the description of the variable compression engine with reference to FIGS. 1 to 13.

The auxiliary power supply 1230 is connected with the host 1100 via the power connector 1202. The auxiliary power supply 1230 may receive the electric power from the host 1100 and may be charged by the electric power. When the electric power is not smoothly supplied (e.g. an interrupted supply and/or a varied value outside of a predetermined range) from the host 1100, the auxiliary power supply 1230 may power the SSD system 1200.

The buffer memory 1240 operates as a buffer memory of the SSD 1200. For example, the buffer memory 1240 may temporarily store data received from the host 1100, or from the flash memories 1221 to 122n, or may temporarily store metadata (e.g., a mapping table) of the flash memories 1221 to 122n. Alternatively, the buffer memory 1240 may temporarily store a variety of information the SSD controller 1210 may use to operate. In an embodiment, the SSD controller 1210 may be configured to compress data stored in the buffer memory 1240 and store the compressed data in the flash memories 1221 to 122n.

According to an embodiment of the inventive concept, a storage device may variably adjust a compression ratio based on a type of data or data-related parameters. In addition, a frequency at which a compression operation may be performed, for example, for a second data may also be adjusted. Accordingly, it may be possible to reduce a time for a compression operation in a write operation requested by an external device (e.g., a host) while securing an available capacity of a mass storage medium. This may mean that the performance and efficiency of the storage device is increased.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An operating method of a storage device that comprises a nonvolatile memory device, the method comprising:
  receiving a first data from an external device;
  compressing the first data based on a first compression ratio;
  programming the compressed first data in the nonvolatile memory device;
  reading a second data from the nonvolatile memory device;
  comparing a size of the second data with a reference size;
  adjusting a second compression ratio to "0" when a size of the second data is greater than the reference size;
  compressing the second data based on the second compression ratio; and
  programming the compressed second data in the nonvolatile memory device.

2. The method of claim 1, further comprising:
  adjusting the second compression ratio based on at least one of a garbage collection count, an update count, or a retention time of the second data.

3. The method of claim 2, wherein the second compression ratio becomes higher as the garbage collection count increases.

4. The method of claim 2, wherein the second compression ratio becomes higher as the retention time increases.

5. The method of claim 1, wherein the reading of the second data, the compressing of the second data based on the second compression ratio, and the programming of the compressed second data are performed during a garbage collection operation.

6. The method of claim 1, further comprising:
  determining whether an available capacity of the nonvolatile memory device is less than or equal to a second reference size; and
  performing the reading of the second data, the compressing of the second data based on the second compression ratio, and the programming of the compressed second data when the available capacity of the nonvolatile memory device is less than or equal to the second reference size.

7. The method of claim 1, further comprising:
  adjusting the second compression ratio based on a request received from the external device.

8. The method according to claim 1, wherein the external device provides compression information to the storage device when there is insufficient storage space to store data.

9. A storage device comprising:
a nonvolatile memory device; and
a memory controller configured to program data in the nonvolatile memory device and to read data from the nonvolatile memory device,
wherein the memory controller comprises:
a variable compression engine configured to compress a first data received from an external device based on a first compression ratio and to compare a size of a size of a second data with a reference size, adjust a second compression ratio to "0" when a size of the second data is greater than the reference size, and compress the second data from the nonvolatile memory device based on the second compression ratio.

10. The storage device of claim 9, wherein the memory controller is configured to program the compressed first data and the compressed second data in the nonvolatile memory device.

11. The storage device of claim 9, wherein the variable compression engine is configured to adjust the second compression ratio based on a garbage collection count, an update count, or a retention time of the second data.

12. The storage device of claim 11, wherein the variable compression engine is configured to increase the second compression ratio as the garbage collection count increases.

13. The storage device of claim 11, wherein the variable compression engine is configured to increase the second compression ratio as the retention time of the second data becomes longer.

14. A storage device comprising:
a nonvolatile memory device; and
a memory controller configured to program data in the nonvolatile memory device and to read data from the nonvolatile memory device,
wherein the memory controller comprises:
a variable compression engine configured to compress first data received from an external device based on a first compression ratio and to compare a size of second data with a reference size, adjust a second compression ratio to "0" when a size of the second data is greater than the reference size, and compress the second data from the nonvolatile memory device based on the second compression ratio that is different than the first compression ratio, wherein the second data is compressed based on a determination that a threshold quantity of actions have occurred; and
wherein the threshold quantity of actions is greater than 1.

15. The storage device according to claim 14, wherein the threshold quantity of actions comprise a garbage collection count or an update count, respectively.

16. The storage device according to claim 15, wherein the variable compression engine is configured to change a threshold quantity of actions to compress the second data based on an amount of available storage space of the storage device.

17. The storage device according to claim 14, wherein the second compression ratio is higher than the first compression ratio, and the variable compression engine is configured to increase the second compression ratio each time the threshold quantity of actions is reached for a respective type of action.

* * * * *